United States Patent [19]

Castleman

[11] Patent Number: 4,654,575
[45] Date of Patent: Mar. 31, 1987

[54] RIPPLE DETECTING POLARITY INDICATOR FOR BATTERY CHARGER

[76] Inventor: Cordell V. Castleman, 10144 Pleasant Ave. S., Bloomington, Minn. 55420

[21] Appl. No.: 830,126

[22] Filed: Feb. 18, 1986

[51] Int. Cl.⁴ .............................................. H02J 7/10
[52] U.S. Cl. ...................................... 320/25; 320/48; 340/636
[58] Field of Search ........................... 320/2–5, 320/20, 25, 48; 302/10 R, 10 BP; 340/636

[56] References Cited

U.S. PATENT DOCUMENTS

| | | | |
|---|---|---|---|
| 3,259,754 | 7/1966 | Matheson | 307/85 |
| 3,308,365 | 3/1967 | St. John | 320/25 |
| 3,659,183 | 4/1972 | Carlson | 320/25 |
| 3,890,555 | 6/1975 | Nelson | 320/2 |
| 4,163,134 | 7/1979 | Budress | 200/157 |
| 4,166,241 | 8/1979 | Grant | 320/25 |
| 4,217,534 | 8/1980 | Cole | 320/25 |
| 4,238,722 | 12/1980 | Ford | 320/25 |
| 4,272,142 | 7/1981 | Zapf | 339/29 |
| 4,400,658 | 8/1983 | Yates | 320/26 |

*Primary Examiner*—R. J. Hickey
*Attorney, Agent, or Firm*—Leo Gregory

[57] ABSTRACT

A ripple current component detecting circuitry embodied in the terminal of a cable connecting a battery charger with a lead acid storage battery to improve safety of use by preventing the indication of a correct polarity of connection where a charger is energized before connection is made with the battery when in fact such an indication may be incorrect, the prevention of such an indication being accomplished by the utilization of the AC ripple component in the charger output. The circuitry detects the ripple and with its use overrides what would otherwise be given as a misleading indication of polarity.

7 Claims, 6 Drawing Figures

RIPPLE DETECTING POLARITY INDICATOR FOR BATTERY CHARGER

BACKGROUND OF THE INVENTION

1. Field of Invention

This invention relates to the construction of a safety circuit in the terminal of a battery charger output cable.

2. Description of the Prior Art

It is known in the prior art of cable terminals which embody circuits which indicate a correct polarity in connecting a battery charger with a lead acid storage battery. However, it is not well known in the case of plugging a cable into a battery charger which is energized to avoid being misled by an erroneous indication of correct polarity. In connecting the cable with a battery, if the polarity in fact is correct, a small spark will occur. If in fact the polarity is incorrect, a very large spark will occur.

It is therefore desirable to have no indication of a correct polarity when the charger is already energized. The operator should be alerted to remove the cables from the charger before making any connections to the battery.

SUMMARY OF THE INVENTION

It is an object of this invention to reduce the likelihood of connecting by cable a battery charger to a lead acid storage battery using incorrect polarity.

It is also an object of this invention to reduce the likelihood of connecting an energized battery charger to a storage battery.

It is more specifically an object of this invention to provide in a cable connecting a battery charger to a battery, a terminal including circuitry which when the cable is connected to an energized charger and the charger output is sufficient to indicate correct polarity with itself but not necessarily a correct polarity with the battery, the circuitry in the terminal detects the AC ripple component in the output from the charger, and the ripple component in the charger output is used to trigger a circuit which causes to be overridden what might otherwise be a misleading indication of a correct polarity and causes the operator to note that it is not safe to connect the charger cable to the battery.

These and other objects and advantages of the invention will be set forth in the following description made in connection with the accompanying drawings in which like reference characters refer to similar parts throughout the several views.

DESCRIPTION OF A PREFERRED EMBODIMENT

Throughout the description herein, conventional current flow positive to negative will be presumed. Diode symbols shall point in the direction of conventional flow, as is also the case with the LEDs (light emitting diodes) used herein as indicators. The use of an LED for an indicator is by way of an example and included is the concept of using visual, audible or other indicators within the scope of this invention. The green LEDs herein have minimum voltage requirements and thus function as zener diodes.

It is presumed to be known in the art of battery chargers that the charger voltage output includes with DC voltage a large amount of AC voltage commonly called a ripple component and a unidirectional current component.

Use is made herein of the minimum forward voltage requirements and the unidirectional current characteristics of the green LEDs; however, other indicators may be used connected in series with additional zener and rectifier diodes.

Figure 1:
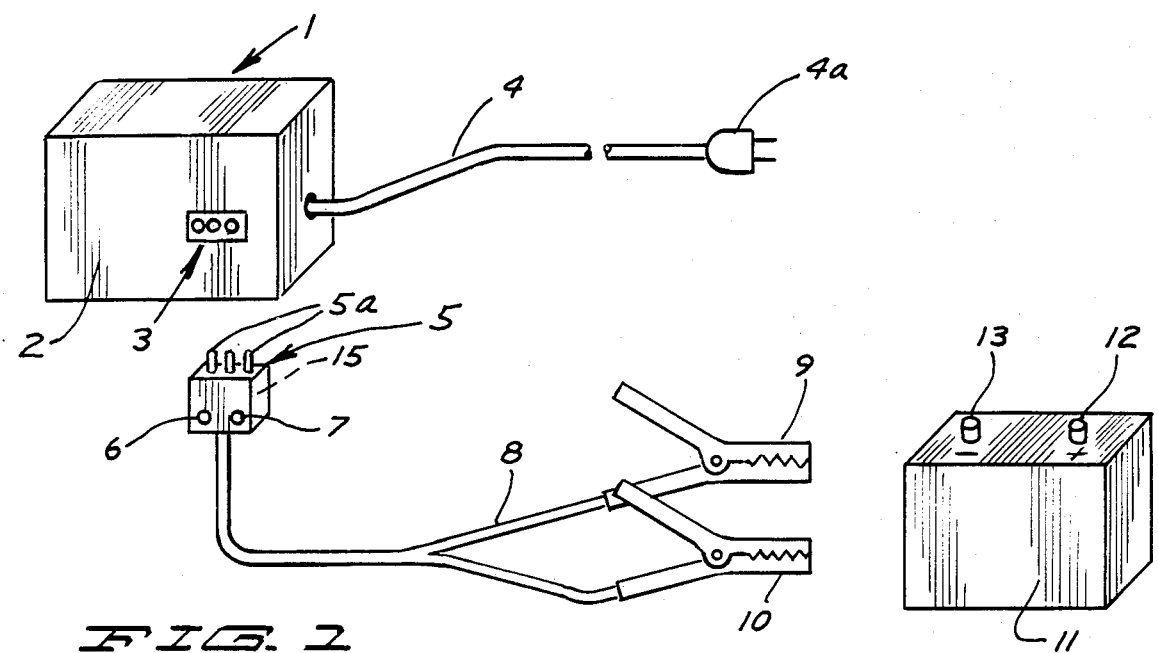
FIG. 1 is a collective view in perspective showing a cable in connection with a battery charger and a storage battery.

Referring to FIG. 1, a conventional type of a battery charger 1 is shown comprising in cross section a substantially rectangular housing 2 having mounted in one side thereof a recessed polarized output connector 3 and having extending therefrom a power line 4 having a terminal plug 4a to connect to an appropriate AC power source.

A connecting or output cable 8 is provided having a polarized terminal plug or terminal 5 at one end having projecting contacts 5a to plug into said charger connector 3. Up-facing on said terminal are indicators here shown as a red LED 6 to indicate incorrect polarity and a green LED 7 to indicate correct polarity. Also included in said terminal is appropriate circuitry. At the other end of said cable are a pair of battery terminal clamps 9 (red) and 10 (black).

A lead acid storage battery is indicated generally by the reference numeral 11. Said battery has a positive terminal 12 and a negative terminal 13.

Figure 2:
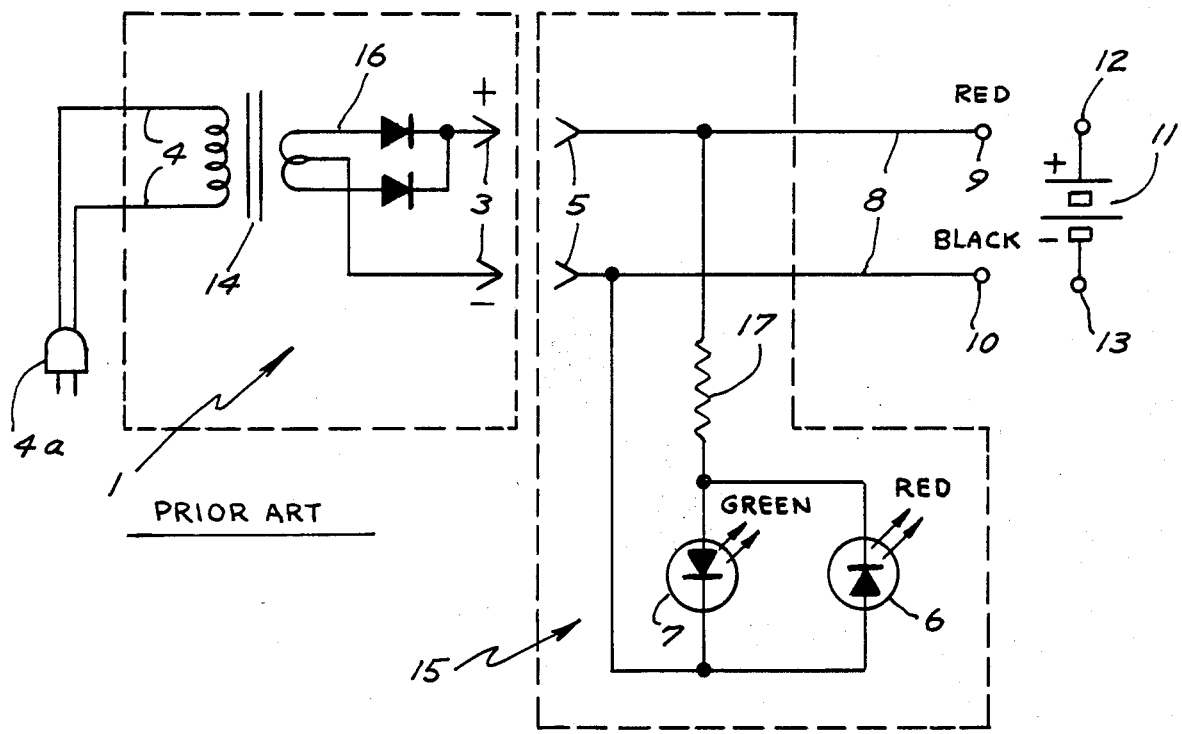
FIG. 2 is a schematic wiring diagram of prior art circuitry connected to the output cable of a battery charger.

With reference to FIG. 2, a prior art circuitry 15 is first shown in connection with said terminal 5. Prior art includes the red and green polarity indicating means generally and known are the use of removable connectors 3 and 5. Said prior art circuit is first described so that there may be shown by comparison the improvements present in the circuitry representing the invention herein.

The circuit 15 operates as follows. The resistor 17 sets the value of the current through the LEDs 6 and 7 to an appropriate value for them, and each LED, since it is a diode as well as a light, conducts only for one polarity, that is, the green diode 7 for the correct polarity and red diode 6 for reversed polarity.

A problem occurs when the cable 8 is disconnected from the battery after use but is left plugged into the charger or is permanently connected to the charger. If the charger is subsequently energized, the green LED 7 will light indicating correct polarity, thus misleading the operator to believe it is safe to connect the other end of the cable to the battery. This will cause a spark at the battery. The spark will be a small one if the polarity is correct at the battery but it will be a very large one if the polarity is not correct at the battery.

It is very desirable to prevent the green LED from becoming illuminated in such a situation with the likelihood of giving misleading information. It is desirable to have a red LED light up to indicate the charger is energized or some other condition may be present requiring correction before connecting the cable to the battery.

Figure 3:
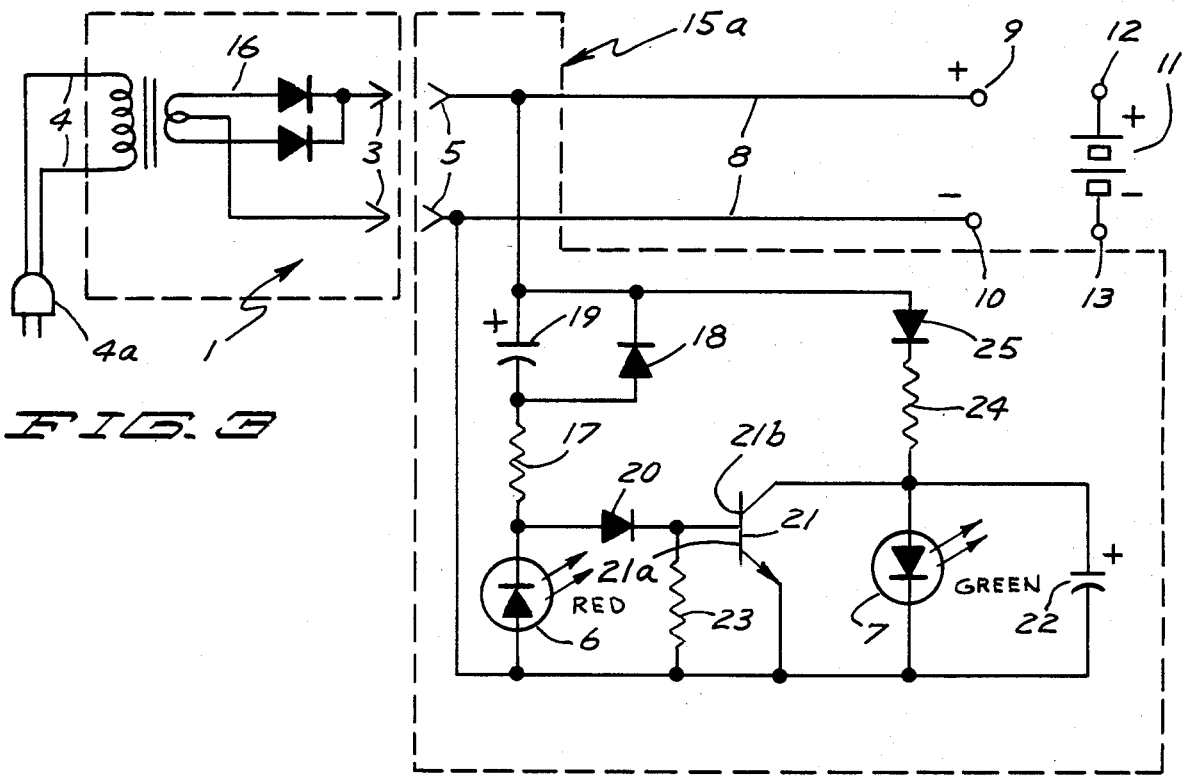
FIG. 3 is a schematic wiring diagram of a preferred embodiment of the invention herein.

Reference is now had to FIG. 3, an example of a preferred embodiment of the circuitry of the invention herein is shown schematically and is indicated generally as 15a. The reference numerals are the same as in FIG. 2 for like parts with a prime added for a modified part and other reference numerals will be applied to different or added parts. A description of the circuitry elements will accompany a description of the operation of the circuit.

In FIG. 3, the components 6, 17, 18, 24, 25, and 7, if taken alone, would function as in the prior art circuit of FIG. 2 and present the same problem as in the case of FIG. 2. The following described entire circuitry of FIG. 3 sets forth the improvement herein.

In the case that in FIG. 3, the cable 8 was plugged into an energized charger 1 prior to attachment to the battery 11 terminals and since the cable terminal 5 is keyed to always be correctly connected to the connector 3 of the charger 1 and since the charger output polarity is the same as that of said battery when correctly connected to the cable terminals, the green LED 7, in prior art circuitry, would light and would thus incorrectly indicate that connection could safely be made to the battery 11. However, with the circuitry herein, the green LED 7 is prevented from lighting by transistor 21, which turns on, and thus by way of its collector 21b and emitter 21a leads, shunts the current from resistor 24 around said green LED 7, thus preventing said current from flowing through said green LED 7.

Transistor 21 is turned on by base current generated during the intervals of increasing magnitude of the voltage and the AC ripple component of the battery charger output. During these intervals, the positively increasing voltage of the AC ripple component of the battery charger 1 output causes a capacitor 19 to become charged. The resulting capacitor charging current also flows through the diode 20 and the base emitter junction 21a of the transistor 21. This current does not flow through the red LED 6 during this interval because the direction of the current is reverse biased relative to said red LED and whereas the diode 20 and the base-emitter circuit 21a are forward biased relative to the direction of the current.

As the peak of the battery charger 1 output voltage passes and the magnitude begins to decrease, the capacitor 19 begins to discharge through the series circuit shown comprised of diode 25, resistor 24, capacitor 22 (which is substantially larger in capacitance value than capacitor 19), the red LED 6 and the resistor 17. Said voltage does not pass through diode 20 which is reverse biased and also the base-emitter junction 21a is now reverse biased.

Thus it is that during intervals of increases in the magnitude of the battery charger output, current flows through capacitor 19, increasing its stored charge, and said current also flows through the base-emitter junction 21a turning it on, thus discharging capacitor 22 and diverting any current which would otherwise flow through the green LED 7; while during intervals of decreases in the magnitude of the voltage output of said charger 1, the capacitor 19 discharges reversing the direction of current flow through it causing the reversed current to flow through the red LED 6, as above described, causing it to light. The red light alerts the operator that the battery charger is connected to a power source and is energized and that it should be disconnected before connecting the cable to the battery.

The desirable result is that the AC ripple component of the charger output, in passing through capacitor 19 and alternately turning on the transistor 21 and the red LED 6, causes the green LED 7 to remain dark but causes the red LED 6 to light. The circuit thus has detected the AC ripple component in the charger output and is caused by said ripple component to override the tendency of the green LED 7 to otherwise light which would give a misleading indication. The alternate turning on and off of said transistor and said red LED 6 is so rapid that the red LED appears to be continuously lighted. The alternation indicated results from the character of the current, caused by the action of the capacitor 19 in response to the AC ripple component present in the charger output when a battery is not connected to it. It is seen that the operator is alerted by the indication on the terminal that the charger is energized, therefore it is not safe to connect the charger cable 8 to the battery 11.

Without the ripple component detection capability of the circuit, as presented, the green LED 7 would be lit and would be misleading, as the charger 1 output is of the correct polarity to cause the green LED 7 to light.

Thus FIG. 3 shows the ripple component detecting circuit 15a. In further description of circuit 15a, resistor 17 limits both the base current to the transistor 21 during periods of increase of the magnitude of the charger output and also the current to the red LED 6 during periods of decrease in the magnitude of the battery charger 1 output to values which are safe for these two components.

Capacitor 22 is necessary because, although the transistor 21 diverts current from the green LED 7 during intervals of increasing output of the battery charger (cable 8 connected to the charger 1 in energized condition but not to the battery), the transistor 21 is off during periods of decreasing output. The green LED 7 would light during these periods and give a misleading indication, except that the capacitor 22, which is being charged by the current during these periods of decreasing charger output causes the current to flow around the green LED 7. Said green LED, acting as a zener diode, has a minimum requirement of voltage to turn it on. This voltage is not reached if capacitor 22 is sufficiently large in capacitance. During the periods of increasing charger output, the transistor 21 is turned on, and it then again discharges the capacitor 22.

The diode 20 may be deleted from the circuitry. It is shown herein because, while not always required, it does assure that the green LED 7 will light when the battery is properly connected and is being charged. Although the battery does reduce the ripple component from the charger to a value which is usually insufficient to cause either the red LED 6 or the base-emitter junction 21a of the transistor 21 to conduct, nevertheless when cable 8 is sufficiently long and the charging current is large enough ripple component may be developed as a result of charging current flowing through its resistance to flow through the red LED 6 and the said base emitter-junction. Diode 20 increases the ripple component necessary for this to happen and so helps insure that the LEDs 6 and 7 are indicating correctly (green, and not red) when the battery is being correctly charged, even though the output cable 8 is large in length and resistance.

Figure 4:
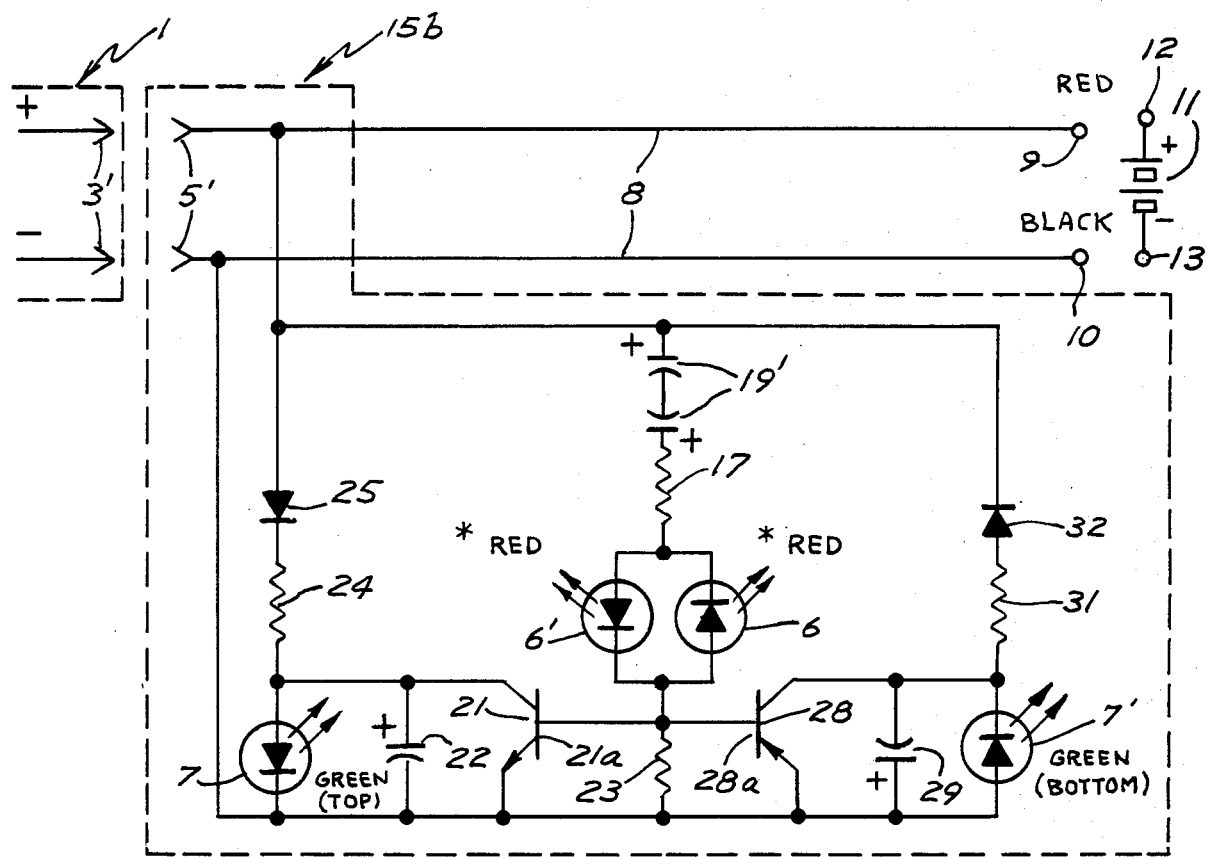
Figure 5:
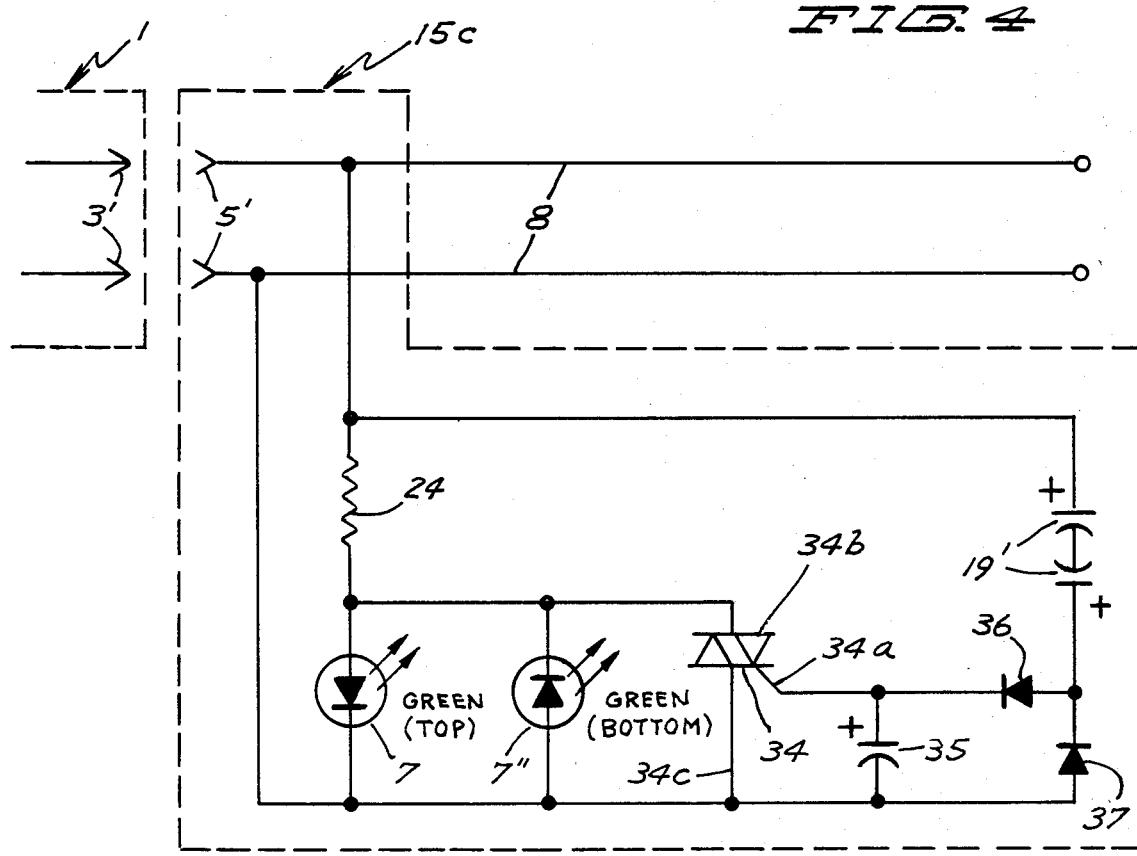

Reference is now had to the embodiment of circuitry 15b herein as shown in FIG. 4. In this embodiment it is never necessary to correct the polarity of the connections 9, 10 at the battery 11. Instead, the charger output connector 3' and the terminal 5' are not polarized but may be reversed 180 degrees in rotation with respect to each other. In addition to the red LED 6 and the green LED 7 appearing at the top or front surface of the terminal 5 as shown in FIG. 1, an additional red LED 6' and the additional green LED 7' will appear at the rear or bottom surface of said terminal 5' but not here shown. In FIGS. 4 and 5, the legends (TOP) and (BOTTOM) mean at the top or bottom of the terminal plug or terminal 5'.

The circuit of FIG. 4 is described utilizing the ripple component detection capability which is the salient feature of this invention, for without it, in the situation of cable 8 being first plugged into the energized charger before attempting to connect to the battery, whichever green LED 7 or 7' is upfacing will light. The ripple detecting circuitry to prevent this works as follows. The AC ripple component of the charger output will flow through the double capacitor 19' (which may be a single non-polarized capacitor), and alternately first through the red LED 6' and the base-emitter junction 21a of the NPN transistor 21, then through the base-emitter junction 28a of the PNP transistor 28 and the red LED 6. Thus said red LEDs 6 and 6' are lighted, indicating the error of connection to the charger before connection to the battery.

The transistors 21 and 28 will also be alternately turned on, discharging their associated capacitors 22 and 29, thus preventing green LEDs 7 and 7' from lighting and falsely indicating that there is a correct sequence of connection. There is not sufficient voltage developed across said capacitors during the intervals when the said transistors are off to cause either of the said green LEDs to become energized; thus, both said red LEDs are lighted, but neither said green LED is lighted. The operator is thus warned of an unsafe sequence of operations, to wit, attempting to connect already energized charger clamps 9, 10 to the battery 11.

Said red LEDs, optionally, may be deleted in FIG. 4 and a direct connection made from resistor 17 to the bases of the transistors 21, 28. Although not preferable, one or both of the resistors 17, 23 may also be omitted. The green LEDs will still provide the necessary indication, the ripple-detecting feature of this modified circuit is unchanged. As before, diodes 25 and 32 protect the components with which they are associated from excessive reverse voltage.

Another modification of the circuitry herein designed to detect the presence of a ripple component is indicated as 15c in FIG. 5. This is an addition to, and an improvement of, the prior art circuit of FIG. 2, with the further change of connectors 3' and 5' to the reversible or nonpolarized type.

This circuit provides for green LEDs 7 and 7' to be at the top and bottom of the terminal 5' connected in inverse parallel with a shunting circuit including a latched current means 34 shown here as a triac, all in series with a current limiting resistor 24. The triac 34 is gated by the circuit comprised of the non-polarized capacitor or double capacitor 19' with capacitor 35 and the diodes 36 and 37. Capacitor 35 is substantially larger in capacitance than is capacitor 19'. Said triac embodies an internal built-in resistor (not shown) connected from its gate 34a to its second main terminal 34c. The first main terminal is indicated at 34b.

With the cable 8 plugged into an energized charger before the cable is connected to a battery, the ripple component detecting portion of said circuit 15c triggers the triac 34 on to a conducting state between its first and second main terminals 34b and 34c, thus shunting current away from the LEDs 7 and 7" permitting neither to light. The ripple component detection is described as follows: The capacitor 19' blocks the DC content from the battery charger output but allows the AC ripple component from the charger output to pass through, alternately causing diodes 37 and 36 to conduct and diode 36 passes this current into capacitor 35 during those instants when the charger output is rising and diode 37 provides a return path for current back into capacitor 19' when the charger output is falling. Over the course of several cycles of AC ripple component, the capacitor 35 is charged to a voltage sufficient to trigger the triac 34, which then shunts out the green LEDs, permitting neither of them to light. This will alert the operator to unplug the cable from the charger before connecting to the battery. Removal of the cable from the charger will reset the triac. The time delay before said triac is triggered on is on the order of a hundred milliseconds. The triac 34 serves conveniently in the circuit 15c as described in being a bidirectional device. Replacement or substitute elements for said triac 34 could be a four-diode bridge connected to a silicon controlled rectifier (SCR), a field-effect transistor (FET), or a bipolar (NPN or PNP) transistor. Red LEDs could replace the diodes 36 and 37.

Figure 6:
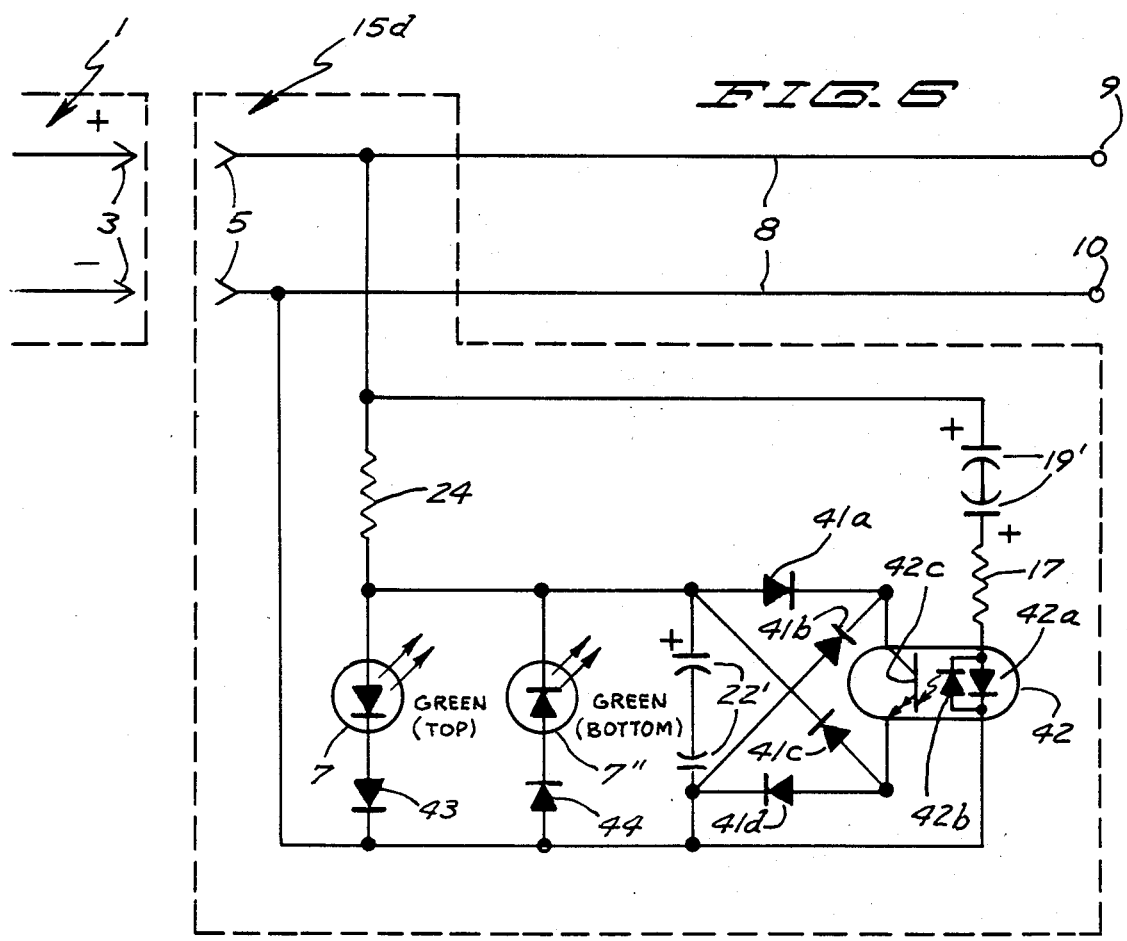
FIGS. 4-6 are schematic wiring diagrams, each showing a modification.

With reference to FIG. 6, circuit 15d is shown as a modification of the circuit 15c to the extent of substituting for the triac 34 and its controlling elements 35–37, the capacitor 22', the diode 41–44 and an opto electronic isolator or opto coupler 42. For purposes of illustration, the opto electronic isolator 42 having a photo Darlington output transistor 42c inside a four-diode bridge 41, has bidirectional input IREDs (infra red LEDs) 42 a,b as shown. Capacitor 22 must now be changed to a non-polarized type of capacitor 22' as shown. Because of the additional voltage drops of the Darlington transistor 42c and the diodes 41a and d or 41b and c, the capacitor 19' will not be completely discharged by the phototransistor 42c when it is turned on by the infra red light emitted by the IREDs 42a and b when AC ripple component passes through the capacitor 22' and thereby through the said IREDs. Diodes 43 and 44 are therefore included to allow the capacitor 22' to charge up to a higher voltage before allowing the green LEDs 7 or 7" to light. The desirable additional voltage drop across the diodes 41 and Darlington transistor 42c is thus seen to be sufficiently offset by the diodes 43 and 44 to prevent the green LEDs from lighting.

It is seen that the essential novelty herein is the prevention of an indication of correct polarity when the battery charger is in fact energized before connection is made to the battery with the cable. The prevention of a misleading indication of correct polarity is accomplished by the detection of the AC ripple present in the battery of the invention herein which, generally stated, consists in an apparatus capable of carrying out the objects above set forth, in the parts and combinations of parts disclosed and defined in the appended claims.

What is claimed is:

1. In connection with a battery charger output cable connected with an energized charger, the terminal of said cable embodying circuitry responsive to an AC ripple component in the battery charger output, said circuitry comprising during an interval of increasing voltage of the ripple component in a battery charger output, a first capacitor responsive to an AC ripple component passing current to the base-emitter junction of a transmitter, a second capacitor discharging current from said base-emitter junction, a correct polarity indicator, said second capacitor diverting current which would otherwise pass through and energize said correct polarity indicator, an incorrect polarity indicator in circuit with said second capacitor being reversely biased relative to said current passing from said second capacitor, during an interval of decreasing voltage of said ripple component in said battery charger output, said first capacitor reversing the direction of said current discharging the same through a second circuit including said second capacitor, said second capacitor having such a greater magnitude of capacitance value than said first capacitor as to pass insufficient voltage to energize said correct polarity indicator and said incorrect polarity indicator being biased relative to said reverse direction of current is energized thereby.

2. In connection with a battery charger output cable connected with an energized charger, a terminal of said cable embodying an AC ripple detecting circuitry, comprising a battery charger having an output of DC voltage including an AC ripple component and having in circuit therewith, during an interval of increasing voltage of the AC ripple component of said charger output, a first capacitor responsive to detecting said ripple component passes current, a transistor in circuit with said capacitor, a correct polarity indicatior, a second capacitor having greater capacitance value than said first capacitor and in circuit therewith with said transistor and with said indicator, said transistor passing current discharging said second capacitor and said second capacitor diverting current from passing through said indicator, an incorrect polarity indicator in circuit with said first capacitor and being reversely biased relative to said current passing through first capacitor, during an interval of decreasing voltage of said ripple component of said charger output, said first capacitor reversing the direction of flow of said current through a second circuit including said second capoacitor, said second capacitor, accepting said current from said first capacitor and passing said current to said incorrect polarity indicator in circuit therewith and having the same polarity as said reversed current, and the voltage across said second capacitor not attaining a magnitude sufficient to energize said correct polarity indicator.

3. In connection with a battery charger output cable connected only with an energized charger, a terminal of said cable embodying an AC ripple detecting circuitry, said circuitry comprising a battery charger having a current output of DC voltage including an AC ripple component, a non-polarized capacitor receiving and passing said current responsive to said AC ripple component, an incorrect polarity indicator, a base-emitter junction of a NPN transistor, a base-emitter junction of a PNP transistor, a second incorrect polarity indicator, said ripple compnent flowing alternately through said first mentioned base-emitter junction and through said second mentioned base-emitter junction, whereby said indicators are energized alternately indicating an incorrect cable connection to an energized charger before connection to a battery.

4. The circuitry of claim 3, including capacitors respectively in circuit with the collectors of said first and second mentioned transistors, said ripple component alternately energizing said transistors, said transistors discharging said capacitors accordingly, first and second correct polarity indicators respectively in circuit with said capacitors, means passing a unidirectional current through said indicators, said transistors when turned on shunting said unidirectional current from said indicators, and said capacitors respectively attaining insufficient voltage when their respective transistors are off, to energize their respective indicators.

5. In connection with a battery charger output cable connected only with an energized charger, a terminal of said cable embodying an AC ripple component detecting cicuitry, said circuitry comprising a battery charger having an output including an AC ripple component and a unidirectional component, a first capacitor blocking the unidirectional component of said output, said capacitor passing said AC ripple component of said output, a second non-polarized capacitor, a first and a second diode, said second diode biased to pass said ripple component to charge said second capacitor during intervals when the voltage of the AC ripple component of said charger output is increasing, said first diode providing a return path for said ripple component during the intervals when said charger output is decreasing, current latching means triggered by said second capacitor upon said second capacitor becoming sufficiently charged by several cycles of AC ripple component, a first and second oppositely biased correct polarity indicators, said current latching means shunting out said indicators not permitting the same to become energized, whereby the operator is alerted to an incorrect cable connection.

6. In connection with a battery charger output cable connected only with an energized charger, a terminal of said cable embodying an AC ripple component detecting circuitry, said circuit comprising a battery charger having an output including an AC ripple component and a unidirectional current component, a first capacitor blocking said unidirectional current component of said battery charger output and passing said AC ripple component therein, a second capacitor charged by said ripple component, an opto electronic isolator means in circuit with a photo-transistor inside a four diode bridge having bi-directional input infra red LEDs in circuit with and between said first and second capacitors, and a first and second oppositely biased correct polarity indicators shunted out by said second capacitor, whereby the operator is alerted of an incorrect cable connection by prevention of the lighting of a correct polarity indicator.

7. The circuitry of claim 6, including diodes respectively in circuit with said polarity indicators causing such an increase in voltage to energize the same that said indicators do not light.

* * * * *